June 30, 1942.                    C. BREBECK                    2,288,068
                            CRANK SHAFT MANUFACTURE
                              Filed July 19, 1940
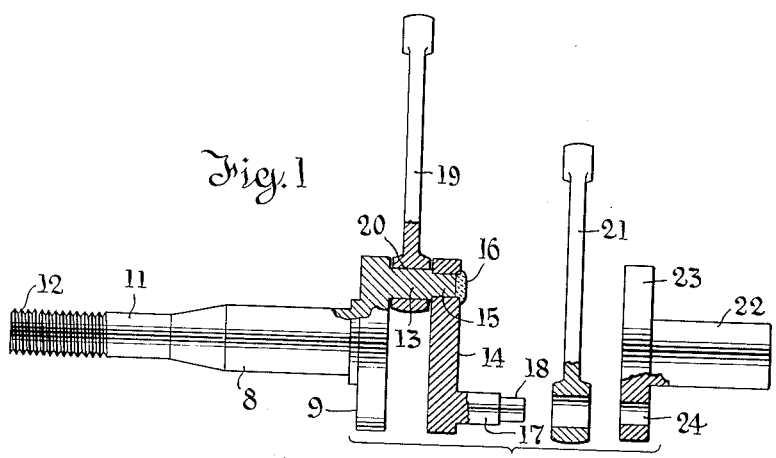
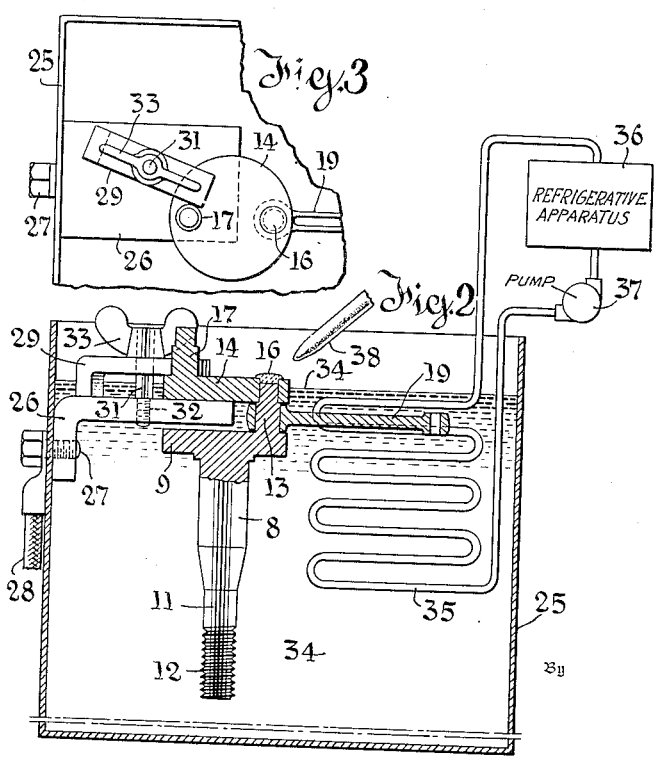
Inventor
Charles Brebeck
Attorneys Patented June 30, 1942

2,288,068

UNITED STATES PATENT OFFICE 2,288,068

CRANKSHAFT MANUFACTURE

Charles Brebeck, Herkimer, N. Y.

Application July 19, 1940, Serial No. 346,419

2 Claims. (Cl. 29—6)

This invention relates to crank shafts for miniature engines, and involves features practicable in such an engine and not desirable or necessary in full sized engines.

In miniature engines the ends or bearing portions of the crank shaft are commonly disproportionately large and heavy. The connecting rods are desirably small and light and the crank pin end (so-called "big end") of the rods should have a one piece bearing because a divided bearing of small size has a short life and frequently fails in service. A large bearing requires a large crank case which is objectionable particularly in small gasoline engines.

The problem is to produce a construction in which hardened crank pins inserted in the bearings of one-piece connecting rods can be welded into crank webs or discs to form a composite crank shaft without damaging the crank pins and bearings.

To do this, shouldered crank pins are pressed into holes drilled through the crank webs so that the ends of the pins are exposed and tight force fit is had. The rod is of course assembled with the pin before the parts are pressed together. Then the shaft is set with its axis vertical and with the rod, pin and about half the crank web submerged in refrigerated water, after which the tip only of the pin is welded on the web.

This construction is practicable because such crank shafts are not subject to much whip. The heavy ends and large bearings maintain alignment. Thus the force fits are sufficient, if reinforced by a tip weld, to resist torsional stresses in the crank pin. Such a weld can be made so quickly that the journal in the pin and the bearing in the rod are not adversely affected.

Single and multiple throw crank shafts can be built up in this way and for very small engines have decided practical advantages.

I prefer to form the pin integrally with one crank web, because fewer welds are needed and the shaft is stronger, but it is practicable to tip weld both ends of a crank pin, one in each of two webs or discs.

In the drawing—

Figure 1 is a side view, partly in section, of one form of crank shaft partially assembled according to the present invention, and in which each crank pin is formed integrally with a crank shaft web;

Fig. 2 is a sectional view, partially diagrammatic, of one form of apparatus for holding the parts and protecting the bearing surfaces against damage from the heat of the welding operation;

Fig. 3 is a partial plan view of the structure shown in Fig. 2.

The crank shafts illustrated are of the type embodying two throws, although it is obvious that the number of throws may be varied as desired and that the invention is applicable to the construction of crank shafts having any desired number of throws.

In Fig. 1, the crank shaft 8 has an integral web or discs 9, having formed integrally with it a crank pin 13 with a reduced portion 15 dimensioned to form a force fit with a hole in a related web. The shaft 8 has a reduced portion 11 threaded at 12 to receive any suitable mechanism to be driven, such as a pulley, fly wheel, propeller or the like.

Pressed to place on the reduced section 15 of the crank pin is a web 14. This is welded only at its tip end as shown at 16. Web 14 has a crank pin 17 reduced at 18 to form a force fit with the hole 24 in a web 23. Web 23 is integral with the portion 22 of the crank shaft. Previous to the welding of the crank pin 13 and the web 14, the connecting rod 19 will be assembled on the crank pin at 20, suitable clearance being left to permit free rotation of the pin relative to the rod.

In completing the assembly of the crank shaft shown, the crank pin 17 will be threaded through the connecting rod 21 and then tip welded to the web 23 in a manner similar to that indicated at 16. In this way, the complete assembly embodies a one-piece crank shaft structure with one-piece connecting rods permanently secured thereon. Obviously, if a single throw only is desired, the web 23 may replace the web 14 during the assembly operation, and the connecting rod 21 omitted.

It has been proposed in the prior art to form crank shafts by welding separate units together. The problem has, however, been complicated by the fact that the bearing surfaces are hardened and the application of sufficient heat to form a weld results in drawing the temper of the hardened parts. The present invention utilizes to advantage the large bearing sections of miniature engines with their inherent strength to resist all forces except torsional ones, hence it is possible to form a crank shaft of the type indicated in the drawing and utilize a welded connection to resist the torsion. Since the weld may be small it may be carried out as described below without damage to the bearing surfaces.

One arrangement suitable for performing this operation is indicated in Fig. 2 of the drawing.

In this figure, the parts are shown in position to tip weld the web 14 to crank pin 13 at 16. The bearing surface of crank pin 13 is protected during the welding operation by the cooling effect of the liquid 34 in tank 25. Secured to the tank at 27 is a clamp comprising a bracket 26. The grounded terminal of the welding apparatus is connected at 28, while the welding electrode is indicated at 38.

An overhung arm 29 rests on the bracket and the overhanging portion is spaced from the bracket to receive a web to be clamped in place by a bolt 31, passing freely through an opening in the arm and threaded into the bracket 26 at 32. The bolt carries a wing nut 33 for closing the clamp. As shown, the web 14 is held in the clamp and the crank pin and web are held by their force fit assembly.

Although in practice there may be times when ambient temperature conditions are sufficient to cool the liquid 34 adequately, it is preferred to employ refrigerating means, such as are indicated diagrammatically in Fig. 2. As there shown, the refrigerating coil 35 is disposed in the liquid 34 in the tank. The coil may contain a suitable refrigerant cooled by refrigerative apparatus 36, and circulated by a pump 37. The use of any equivalent structure is contemplated and the cooling of the liquid may be performed by dry ice or other suitable refrigerative medium which is, for illustrative purposes, indicated at 34. The level of the cooling medium is adjusted to submerge the bearing surfaces and a portion of the web adjacent the weld.

The above type of manufacture takes advantage of the disproportionate size of the main crank shaft bearing portion and the other parts of the shaft in crank shafts of miniature engines. It results in a crank shaft which is simple to produce, and satisfactory in operation because the connecting rods are in one piece. It offers the very distinct advantage that smaller crank case clearances are necessary than where bolts and nuts are relied upon for holding the connecting rod on the crank pins. This reduction in clearance is of particular value in miniature engines where the crank case volume is a critical factor.

What is claimed is:

1. The method of making a plural part crank shaft with one-piece connecting rods assembled thereon, which consists in forming separate units in which at least one end of each crank pin is unattached, hardening the pins of said units, assembling a one-piece hardened connecting rod on each said pin, assembling a web to each said pin by a force fit to secure the rod thereon, submerging the cooperating hardened bearing surfaces of the pin and rod in a cooling liquid, and then welding the pin to the web while the cooperating hardened bearing surfaces of the pin and rod are subjected to the action of the cooling medium.

2. The method of making a crank shaft of separate units composed of separate webs each having an integral crank pin, which consists in hardening the pin of each unit, assembling a one-piece hardened connecting rod on a pin of one unit and assembling the web of a second unit on said pin by a force fit, and welding the pin and web to complete the securing of the connecting rod while refrigerating the hardened bearing surfaces adjacent the weld by submerging them in a liquid cooling bath.

CHARLES BREBECK.